United States Patent [19]
Lande et al.

[11] Patent Number: 5,850,299
[45] Date of Patent: Dec. 15, 1998

[54] METHOD OF CHOOSING AN OPTIMUM ANGLE BETWEEN A REFERENCE BEAM AND AN OBJECT BEAM TO RECORD A HOLOGRAM

[75] Inventors: David Lande, Stanford; John F. Heanue, San Mateo; Matthew C. Bashaw, Menlo Park; Lambertus Hesselink, Woodside, all of Calif.

[73] Assignee: The Board of Trustees of the Leland Stanford Junior University, Palo Alto, Calif.

[21] Appl. No.: 655,903

[22] Filed: May 31, 1996

[51] Int. Cl.$^6$ ................................. G03H 1/06; G03H 1/28
[52] U.S. Cl. ..................................... 359/1; 359/24
[58] Field of Search ................... 359/3, 4, 7, 11, 359/22, 24, 1; 369/103

[56] References Cited

U.S. PATENT DOCUMENTS 5,440,669  8/1995  Rakuljic et al. ........................ 359/22
5,491,570  2/1996  Rakuljic et al. ........................ 359/1

OTHER PUBLICATIONS

Cambell, S. et al, Hybrid sparse–wavelength angle–multiplexed optical data storage system, Optical Society of America, Aug. 22, 1994, pp. 2161–2163.

Bashaw, M. et al., Cross–talk considerations for angular and phase–encoded multiplexing in volume holography, Optical Society of America, Sep. 1994, pp. 1820–1835.

*Primary Examiner*—Jon Henry
*Attorney, Agent, or Firm*—Lumen Intellectual Property Services

[57] ABSTRACT

A method of choosing an angle between a reference beam and a signal beam in a holographic storage apparatus is presented. The angle between the reference and signal beams can be optimized in light of crosstalk, scattering and wavelength seperation considerations.

2 Claims, 5 Drawing Sheets

Reference Beam

Signal Beam

METHOD OF CHOOSING AN OPTIMUM ANGLE BETWEEN A REFERENCE BEAM AND AN OBJECT BEAM TO RECORD A HOLOGRAM

The present invention was made with government support under contract No. MDA-972-95-3-004, awarded by the ARPA/NSIC HDSS Consortium. The government has certain rights in this invention.

FIELD OF THE INVENTION

The present invention relates to the field of holographic storage, and in particular to a method and apparatus for wavelength multiplexed digital holographic storage in a non-counterpropagating geometry.

DESCRIPTION OF PRIOR ART

Several multiplexing approaches have been proposed for holographic data storage systems, including spatial, angular, phase-code and wavelength multiplexing. For an overview of these multiplexing techniques, see for example the article by Hesselink and Bashaw in *Opt. and Quant. Elect.* 25: S611 (1993), herein incorporated by reference. Since spatial multiplexing is conceptually different from the other three approaches, the spatial approach will not be addressed here in detail. Furthermore, for some purposes phase-code multiplexing can be viewed as an extension of angular multiplexing. Thus, the following discussion will focus on angular and wavelength multiplexing.

An important objective in any multiplexing approach is the minimization the crosstalk between different pages. Interpage crosstalk is minimized by ensuring that the stored pages are mutually orthogonal, i.e. that different pages are stored in non-overlapping regions of k-space. The requirement that the gratings corresponding to different pages not overlap constrains the spacings (angular or wavelength) between pages. Since smaller spacings allow the storage of a larger number of pages, it is in general desirable to minimize the interpage angular or wavelength spacings.

Interpage spacings are minimized in a perpendicular geometry for angular multiplexing, and by a counterpropagating geometry for wavelength multiplexing, where the terms perpendicular and counterpropagating refer to the angle between the reference and the signal beam within the storage medium. For a more detailed treatment of crosstalk considerations in holographic memories, see the articles by Bashaw et al. in *J. Opt. Soc. Am. B*, 11: 1820–1836 (1994), Hong et al. in *Opt. Eng.* 34(8): 2193–2203 (1995), and Rakuljic et al. in *Opt. Lett.* 17(20): 1471–1473 (1992), which are herein incorporated by reference.

Figure 1:
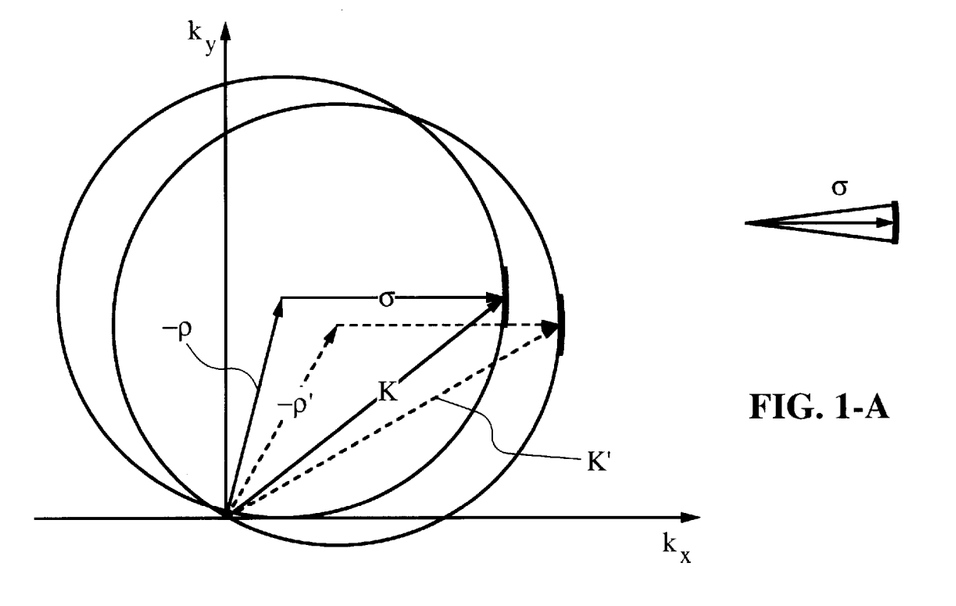

The crosstalk advantage of the perpendicular geometry for angular and phase code multiplexing, and of the counterpropagating geometry for wavelength multiplexing can perhaps be better understood by considering the k-space diagrams in FIGS. 1-A and 1-B. The figures show the relative k-space location of the gratings corresponding to two different pages for, respectively, angular and wavelength multiplexing. The symbols $\rho$ and $\rho'$ denote reference beam wave vectors, $\sigma$ denotes a collection of signal beam wave vectors corresponding to a page, and K and K' indicate the gratings recorded by the interference of $\rho$ and $\sigma$, and of $\rho'$ and $\sigma$, respectively.

Note that, for clarity of presentation, the angle between $\rho$ and $\sigma$ in FIG. 1-B is shown to be slightly different than its actual value of $\pi$ in the counterpropagating geometry. Also for clarity, the vectors K and K' in FIG. 1-B have different orientations, even though they are parallel in the counterpropagating geometry. That is, all the vectors shown in FIG. 1-B lie along the same axis in a counterpropagating geometry. The vectors $\sigma$ and $\rho'$ corresponding to K' are not shown in FIG. 1-B.

For angular multiplexing (FIG. 1-A), $\rho$ and $\rho'$ differ slightly in orientation, while for wavelength multiplexing (FIG. 1-B) $\rho$ and $\sigma'$ differ in magnitude. Also, as illustrated in FIGS. 1-A and 1-B, the gratings K and K' are preferably recorded in non-overlapping regions of k-space, so as to avoid interpage crosstalk.

Of the common multiplexing approaches, angular multiplexing is perhaps the most widely used. Relative to angular multiplexing, wavelength multiplexing offers the advantage of not requiring any moving parts or precision rotation stages, and of allowing shorter access times. The storage capacity of wavelength multiplexed systems described so far is significantly inferior, however, to that of typical systems using angular multiplexing. Moreover, while digital storage in an angular multiplexed system has been demonstrated (see the article by Heanue et al. in *Science* 265: 749–752 (1994)), no digital storage system using wavelength multiplexing has been described so far.

System noise has been the primary challenge facing digital storage in a wavelength multiplexed system. The noise requirements for a useful digital memory are far more stringent than for an analog image memory. For example, while an analog image can be recovered at a signal-to-noise ratio (SNR) as low as 2–3, a digital memory with such a SNR would have a bit error rate (BER) on the order of $10^{-1}$, which is unacceptable in practice. In fact, a BER of $10^{-12}$ is considered an industry standard for storage products. Error correction codes can be used to improve the BER for a given SNR. Even with the use of error correction codes, however, a corrected BER of $10^{-12}$ requires a maximum uncorrected BER of $10^{-4}$ to $10^{-5}$, which corresponds to a SNR of at least 10 to 20 dB.

For more information on the relationship between SNR and BER, and for a discussion of noise sources in holographic memories see for example Chapter 9 of the doctoral thesis of Heanue, Dept. of Applied Physics, Stanford University (1996), herein incorporated by reference. Briefly, several major noise sources affect the performance of typical holographic storage systems. Shot and readout (detector) noise affect system performance negatively. Imperfections in the medium structure and in optical elements cause undesired scatter, which is independent on the number of pages stored in the system and leads to a reduction in signal to noise ratio (SNR). Interpage crosstalk also causes a decrease in SNR.

Interpage crosstalk has been the most studied of the noise sources in holographic systems. For a review of interpage crosstalk for angular and phase-code multiplexing see for example the above-incorporated article by Bashaw et al. Articles discussing interpage crosstalk in wavelength multiplexed systems include those by Curtis et al. in *Opt. Lett.* 18: 1001–1003 (1993), and by Yariv in *Opt. Lett.* 18: 652–654 (1993), both of which are herein incorporated by reference.

Previous implementations of wavelength multiplexed memories have focused on reducing crosstalk limitations on capacity, but have not addressed the challenges facing digital storage in a wavelength multiplexed system.

The desirability of digital storage in a wavelength-multiplexed system has been acknowledged. For example, in U.S. Pat. No. 5,440,669, herein incorporated by reference, Rakuljic et al. point out the need for digital storage for holographic storage systems in general, and describe a wavelength multiplexing system in a counterpropagating geometry (see the section "Orthogonal Data Storage" in the Rakuljic patent). The patent suggests the possibility of using a wavelength multiplexed system to store digital data but does not teach how digital storage can be achieved in practice.

The possibility of storing digital data in a wavelength multiplexed holographic memory is also mentioned in an article by Campbell et al. in *Opt. Lett.* 19(24): 2161–2163 (1994), herein incorporated by reference. The article describes a technique labeled sparse-wavelength angular multiplexing (SWAM), and the use of the technique for the storage of 100 analog images. The technique is adapted from conventional angular multiplexing methods, and uses the conventional angular multiplexing perpendicular geometry. Thirty-four closely-spaced angles are used for angular multiplexing, and three widely separated wavelengths are used for wavelength multiplexing at each angle to allow the storage of 3×34=102 images. A different fixed-wavelength diode laser is used to generate light at each of the three wavelengths.

Sparse-wavelength angular multiplexing does not allow significantly reduced access times as compared to angular multiplexing. Moreover, the use of different light sources makes the SWAM system relatively complex.

OBJECTS AND ADVANTAGES OF THE INVENTION

In light of the above, it is a primary object of the present invention to provide a method and apparatus for storing digital data in a wavelength multiplexed holographic memory. It is another object of the present invention to provide a wavelength multiplexed holographic memory with reduced scatter noise. It is yet another object of the present invention to provide a wavelength multiplexed holographic memory in a non-counterpropagating geometry. It is yet another object of the present invention to provide a wavelength multiplexed holographic memory in a perpendicular configuration. It is yet another object of the present invention to provide a sparse-angle wavelength multiplexing method and apparatus. It is another object of the present invention to provide an angular-wavelength multiplexed holographic memory with short access times and suitable for implementation with a single tunable light source. It is still another object of the present invention to provide a method of optimizing the angle between the reference and signal beams in a wavelength multiplexed holographic memory. Further objects and advantages of the invention will become apparent upon consideration of the ensuing description and accompanying figures.

SUMMARY OF THE INVENTION

The primary difficulty facing digital storage in a counter-propagating wavelength-multiplexed system is the high intensity of backscatter from imperfections in the storage medium and optical elements. The present invention allows a reduction in scattering noise by using a noncounterpropa-gating geometry. An apparatus of the present invention is significantly superior in noise performance, and only marginally inferior in crosstalk-limited capacity, to a conventional counterpropagating system.

The present invention provides a holographic digital data storage apparatus comprising a reference means for generating a reference beam incident on a storage medium, a signal means for generating a signal beam incident on the storage medium, a wavelength modulating means for modulating the wavelengths of the reference and signal beams, and a signal beam modulating means for storing a first digital data page S[k] at a first wavelength w[k] and a second digital data page S[k+n] at a second wavelength w[k+n].

For an apparatus of the present invention, it is crucial that the signal and reference beams not be counterpropagating, so that scatter from optics and medium imperfections is reduced. Preferably, the angle between the reference and signal beams is 90±10 degrees. In. a preferred embodiment, light of wavelengths w[k] and w[k+n] is produces by the same light source, i.e. a difference between w[k] and w[k+n] is less than a wavelength span of the wavelength modulating means. Preferably, the signal and reference beams are generated by one or more diode lasers.

In an embodiment of the present invention, wavelength multiplexing is combined with spatial multiplexing through the use of a storage medium comprising a plurality of independently addressable stacks. In another embodiment of the present invention, wavelength and angular multiplexing are combined to store digital data using a technique named sparse-angle wavelength multiplexing. In this embodiment, the apparatus comprises a rotation means for rotating the reference beam relative to the medium.

Preferably, an apparatus of the present invention also comprises a multiplexing control means for controlling the wavelength multiplexing and/or the rotation means such that first page S[k] and second page S[k+n] are stored in non-overlapping regions of k-space.

The present invention further provides a method of storing digital data in a holographic memory. A method of the present invention comprises the steps of generating a reference beam incident on a storage medium, generating a signal beam incident on the storage medium, and storing a first digital data page S[k] at a first wavelength w[k] and a second digital data page S[k+n] at a second wavelength w[k+n]. It is critical in a method of the present invention that the reference and signal beams not be counterpropagating. Preferably, the reference and signal beams are substantially perpendicular. More preferably, the difference between w[k] and w[k+n] is less than a wavelength span of a wavelength modulating means used to modulate the wavelength of the reference beam.

The present invention further provides a method of optimizing the angle between the reference beam and the signal beam. Scattering intensities and minimum wavelength separations are evaluated at a first angle θ[k] and a second angle θ[k+n]. One of the two angles is then chosen as an optimal angle. Preferably, the values f[k] and f[k+n] of a utility function f are computed for the two angles, and the optimal angle is defined as the angle corresponding to an optimal (e.g. maximal) value of the utility function.

BRIEF DESCRIPTION OF THE DRAWINGS

FIG. 1-A is a k-space diagram illustrating the storage of two angle-multiplexed gratings in a perpendicular geometry.

FIG. 1-B is a k-space diagram illustrating the storage of two wavelength-multiplexed gratings in a counterpropagating geometry.

FIG. 2-A shows the relative variation of the minimum frequency spacing with the angle between the reference and the signal beam in a wavelength multiplexed system, according to the present invention.

FIG. 2-B illustrates qualitatively the observation that scatter increases with the angle θ between the reference and the signal beam, for θ between π/2 and π, according to the present invention.

FIG. 3-A is a simplified perspective view of an apparatus of the present invention.

FIG. 3-B is a top view of an apparatus similar to that shown in FIG. 3-A.

FIG. 4-A shows a medium with a rectangle-shaped cross-section in a perpendicular configuration, according to the present invention.

FIG. 4-B shows the medium of FIG. 4-A, wherein the angle between the reference and signal beams is slightly less than 90°, according to the present invention.

FIG. 4-C shows the medium of FIG. 4-A, wherein the angle between the reference and signal beams is slightly less than 180°, according to the present invention.

FIG. 4-D shows a parallelepiped-shaped medium illuminated by reference and signal beams not in a counterpropagating or perpendicular geometry, according to the present invention.

FIG. 4-E shows the medium of FIG. 4-D, where the beams are perpendicular to the medium faces, according to the present invention.

FIG. 5-A illustrates spacings of recorded gratings in a sparse-angle wavelength multiplexing approach of the present invention.

FIG. 5-B illustrates spacings of recorded gratings in a sparse-wavelength angle multiplexing prior art approach.

DESCRIPTION

In the following discussion, for a quantity A, the notation {A[k]} is understood to refer to a set of A[k] for some values of k. The notation A[k] is understood to correspond to some (fixed) value of k. The term wavelength separation is understood to encompass wavelength and frequency separations. The statement that a reference beam is rotated relative to a medium is understood to mean that the orientation of the reference beam within the medium is changed, by rotation of the reference beam and/or the medium. The statement that two beams are substantially noncounterpropagating is understood to mean that the angle between the beams is less than 175 degrees. The term nonrectangular is understood to encompass any shape that is not a four sided-polygon, and four-sided polygons wherein an angle between two sides is not within 90±5 degrees.

Crosstalk considerations limit the minimum frequency spacings between pages, and thus the system capacity, in a wavelength multiplexed holographic memory. The crosstalk-limited wavelength selectivity in a wavelength multiplexed system depends on the angle between the reference and signal beams, and on other parameters. The crosstalk-limited wavelength selectivity varies according to separations in frequency v given by $$\Delta v = \frac{c}{nL} \frac{1}{1 - \cos\theta} \quad [1]$$

where c is the speed of light, n is the index of refraction of the storage medium, L is the thickness of the medium, and θ is the angle between the reference and signal beams, with θ=π corresponding to the counterpropagating geometry.

Figure 2:
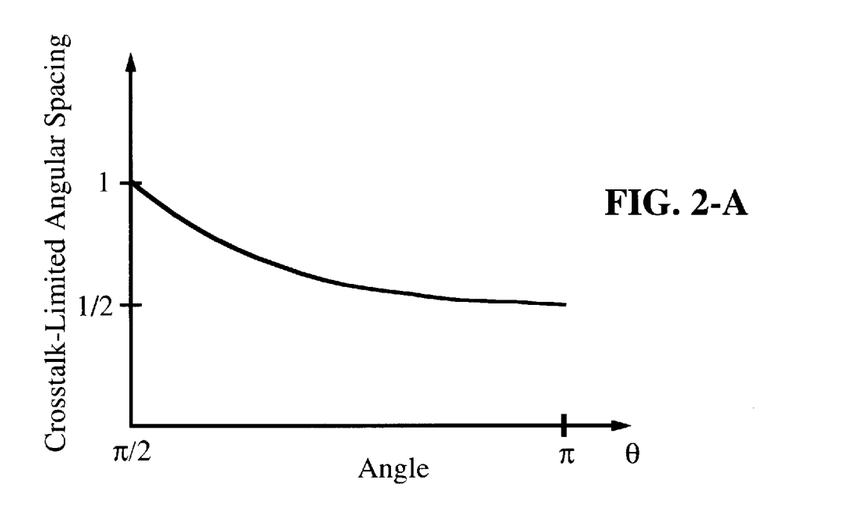

As can be seen from equation [1], the counterpropagating geometry offers the greatest frequency selectivity, and thus the greatest potential capacity in a crosstalk-limited storage system. As θ varies from π to π/2 the selectivity decreases, as shown in FIG. 2-A. The perpendicular geometry (θ=π/2) is characterized by a loss of crosstalk-limited selectivity of a factor of 2, relative to the counterpropagating geometry.

The counterpropagating geometry thus optimizes the crosstalk-limited capacity of a system. In current holographic memories, however, it is not interpage crosstalk, but scatter-generated noise that limits system performance. The present invention provides an apparatus and method for reducing scattering intensity, thus eliminating the principal obstacle facing the storage of digital data in a wavelength multiplexed system.

FIG. 2-B shows qualitatively the dependence of the scattering intensity on the angle between the reference and signal beams in a typical holographic medium, such as a Fe-doped lithium niobate crystal. The exact form of the intensity variation with angle depends on the particular crystalline properties of the medium used. An important feature of the scattering variation with angle is that the scattering intensity has a strong peak at θ=π due to backscatter from optical elements and medium impurities.. For example, the scatter at θ=π in a commercially available Fe-doped $LiNbO_3$ crystal was observed to be in excess of an order of magnitude greater than at θ=π/2. It is thus likely, at least in some crystals, that the observed backscatter is not due primarily to scattering from approximately-spherical sources of size on the order of the wavelength of light used (the equivalent in solids to Rayleigh scattering), but rather to scattering from larger crystalline defects such as quasi-mirror surfaces.

It is important to note that the selectivity depending on the function in FIG. 2-A is the crosstalk-limited selectivity of a system. Crosstalk need not be the primary factor limiting selectivity, however. In fact, systems using currently available tunable light sources are limited in their selectivity by the addressable resolution of the tunable source, rather than by crosstalk considerations. For example, for a 1 cm-thick lithium niobate crystal, and at a wavelength of 670 nm, the wavelength selectivity given by equation [1] is on the order of 0.01 nm, whereas the addressable wavelength resolution available with state of the art tunable lasers is on the order of 0.1 nm. Thus, the potential capacity advantage of the counterpropagating geometry is not relevant for systems using currently available tunable light sources.

FIGS. 2-A and 2-B help illustrate the observation that an optimization of system geometry primarily in light of crosstalk considerations (as-in prior art systems), may not be equivalent to an overall optimization of system performance. In the present invention, the angle between the reference and signal beams is chosen by taking in consideration crosstalk, scattering noise, and other relevant parameters. In a preferred embodiment, the angle is chosen by considering a tradeoff between crosstalk-limited selectivity and scattering noise.

Consider a set {θ[k]} of possible angles between the reference and signal beams, and two angles θ[k] and θ[k+n] in the interval [π/2, π]. A method of the present invention evaluates the scattering intensities and the minimum wavelength separations (selectivities) at θ[k] and θ[k+n]. Values of a utility function f[k] and f[k+n] are then computed for the two angles, where the utility function f depends on scattering intensity and on wavelength (or frequency) selectivity. One of the evaluated angles is then chosen as an optimal angle. Clearly, the method above can be easily generalized to more than two angles.

In a system where the minimum wavelength selectivity is determined by factors independent of system geometry (such as the resolution of a tunable light source), the optimal angle is the angle which leads to minimized scattering noise. Thus, in a preferred embodiment of the present invention, the angle between the reference and signal beams is substantially 90 degrees, preferably 90±10 degrees. More preferably, the angle is within 5° of 90°.

Figure 3:
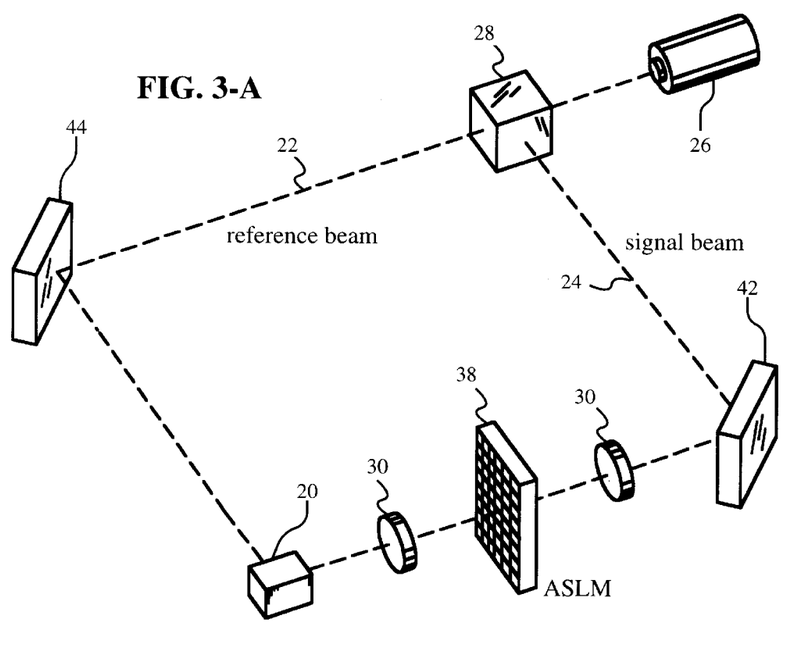

FIG. 3-A is a simplified perspective view of a preferred embodiment of the present invention, and FIG. 3-B is a more detailed top view of a system similar to that in FIG. 3-A. Information is recorded in a storage medium 20 as an interference pattern produced by a reference beam 22 and a signal beam 24. Storage medium 20 is preferably a photorefractive crystal such as a Fe-doped lithium niobate crystal. Other materials are also suitable for a medium of the present invention, as is apparent to the skilled artisan.

A reference means is used generate and/or manipulate the reference beam, and a signal means is used to generate and/or manipulate the signal beam such that the reference and signal beams are substantially non-counterpropagating within the medium. The reference means preferably comprises a tunable coherent light source 26, and optical elements used to manipulate the reference beam. In a preferred embodiment, such optical elements include a beam splitter 28, a beam expander 48, lenses 32, and a mirror 44. Ways of arranging lenses and mirrors for spatially manipulating and Fourier transforming beams are well known in the art. Light source 26 is preferably a high-power external-cavity tunable diode laser operating at 670 nm. Clearly, other types of sources and other wavelengths can be used. The signal means preferably comprises a light source such as source 26 and optical elements used to manipulate the signal beam. Preferably, such elements include a mirror 42, a beam expander 50, and lenses 30. Information is read out by a camera 36. Preferably, camera 36 is a CCD array.

An apparatus of the present invention also comprises a wavelength modulating means capable of producing light of a first wavelength w[k] and of a second wavelength w[k+n]. Preferably, the wavelength modulating means comprises a tunable coherent light source having a wavelength span. In another embodiment, the wavelength modulating means comprises a modulator capable of tuning the wavelength of light; such a modulator also has a wavelength span. The difference between the two wavelengths w[k] and w[k+n] is preferably less than the wavelength span of the wavelength modulating means.

The apparatus further comprises a signal beam modulating means. Preferably, the signal beam modulating means includes an amplitude spatial light modulator (ASLM) 38. ASLM 38; which selectively modulates the amplitude of light incident on its pixels, encodes information into signal beam 24. The signal beam modulating means are used to store a first page S[k] at the first wavelength w[k], and a second page S[k+n] at a second wavelength w[k+n].

Preferably, the apparatus further comprises a multiplexing control means 52 for selecting the wavelengths w[k] and w[k+n] such the k-space representations of the gratings corresponding to S[k] and S[k+n] do not overlap. Control means 52 preferably comprises computer software, although a hardware implementation of means 52 is also possible, as is apparent to the skilled artisan. Preferably, control means 52 is also used to control source 26, camera 36, ASLM 38 and, in one embodiment, the angular orientation of mirror 44 or of medium 20.

A partially reflective mirror 60 is used during readout to split part of the signal beam to a photodetector 62. The signal at photodetector 62 is proportional to the average light intensity of signal beam 24 at camera 36. Since there is substantial variability in the wavelength of light emitted by common tunable sources, a feedback means is used to feed the output of photodetector 62 to source 26. Preferably, control means 52 comprises the feedback means. Control means 52, in turn controls the wavelength of light emitted by source 26.

In an embodiment of the present invention, wavelength and spatial multiplexing are combined for increasing the system capacity and reducing access times. In this embodiment, the medium comprises a plurality of independently addressable stacks.

In the present invention, it is important to consider the constraints placed on the angle between the reference and the signal beam by the shape of the storage medium. For example, commonly used photorefractive media such as lithium niobate crystals are commercially available in cubical form. For a cube-shaped crystal, the 90° and 180° geometries make most efficient use of available storage space.

Figure 4:
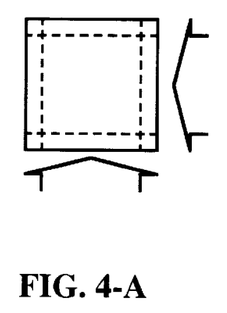

FIG. 4-A is sectional view through of a medium having a rectangle-shaped cross-section. The arrows denote the signal and reference beams, and the dotted lines show the extent of the beams within the medium. Information is stored only in the part of the medium that is illuminated by both the reference and signal beams. The reference and signal beams are parallel to the medium sides, and thus substantially all of the medium volume can be used for storage.

FIG. 4-B shows an arrangement similar to that in FIG. 4-A, in which one of the beams is displaced by about 10° from the perpendicular geometry. For clarity of presentation, the effect of refraction at the medium interface is not considered. As is apparent to the skilled artisan, the actual orientation of the beam within the medium can be easily determined from Snell's law. Alternatively, the medium of FIG. 4-B can be surrounded by an index-matched material.

Since significant scatter occurs from the edges of the medium, the extent of the medium illuminated by both beams is constrained by the requirement that the beams not illuminate the medium edges. Thus, some of the space in the medium is not used for storage. FIG. 4-C shows a medium similar to those in FIGS. 4-A and 4-B, where one of the beams is displaced by about 10° from the counterpropagating geometry. For angles substantially different from 90° or 180°, the fraction of the medium illuminated by both beams can be increased through the use of a medium having a nonrectangular cross-section in the plane of the reference and signal beams, as shown in FIG. 4-D. The section defines a plurality of medium faces, where the faces do not lie in the plane of the reference and signal beams; preferably, the faces are orthogonal to the section. For the medium in FIG. 4-D, the section defines four faces. The reference beam is preferably parallel within the medium to at least one of the faces, as shown in FIG. 4-D. In another embodiment, the reference beam is perpendicular to at least one of the faces, as shown in FIG. 4-E. In the particular arrangement shown in FIG. 4-D, substantially all of the medium extent is used for storage.

In an embodiment of the present invention, the apparatus further comprises a rotation means for rotating the reference beams relative to the medium. The rotation occurs around an axis perpendicular to the plane defined by the reference and signal beams. In a preferred embodiment, the rotation means comprises an acousto-optical deflector. In another embodiment, the rotation means comprises a precision rotation stage. It is preferred that the rotation stage be used to rotate mirror 44, although it is in general possible to rotate medium 20.

A first page S[k] is stored at the first wavelength w[k] and at a first angular orientation within the medium, and a second page is stored at the second wavelength w[k+n] and at a second angular orientation within the medium. That is, the second page S[k+n] is stored at an angular orientation different from that of the first page S[k].

Figure 5:
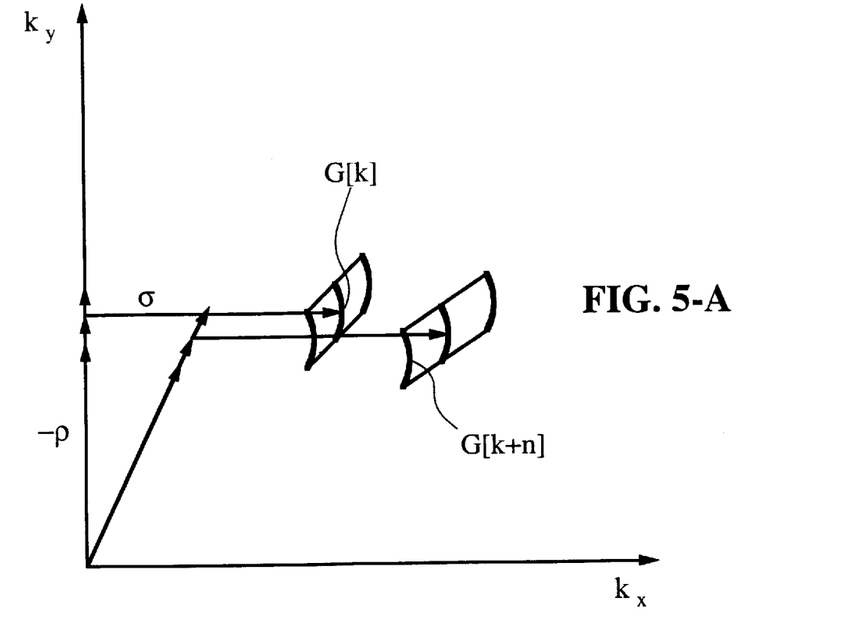

Preferably, the angular orientations and the wavelengths for S[k] and S[k+n] are chosen such that the gratings corresponding to S[k] and S[k+n] not overlap in k-space, as illustrated in FIG. 5-A. The figure shows gratings corresponding to six pages stored at three wavelengths and two angular orientations. For clarity of presentation, only two of the six σ vectors, and none of the K vectors are shown. Gratings corresponding to possible choices of S[k] and S[k+n] are marked G[k] and G[k+n], respectively.

FIG. 5-B illustrates the multiplexing approach disclosed in the above-incorporated article by Campbell et al, showing six gratings stored at two wavelengths and three angular orientations. As can be seen from a comparison of the grating positionings in FIGS. 5-A and 5-B, the two multiplexing approaches use the available k-space in different ways. In the present invention, closely spacing the wavelengths rather than the angles allows the use of a single tunable light source, thus reducing the complexity of the storage system. Moreover, access times for an apparatus of the present invention are comparable to pure wavelength multiplexing access times, and are thus much lower than pure angular, or sparse-wavelength angular multiplexing access times.

SUMMARY, RAMIFICATIONS, AND SCOPE

There are many ways to store digital images in a wavelength-multiplexed, non-counterpropagating digital holographic memory, without departing from the spirit of the invention. Therefore, the scope of the invention should be determined, not by examples given, but by the appended claims and their legal equivalents.

We claim:

1. A method of choosing an optimum angle between a reference beam and a signal beam in a holographic storage apparatus to record a hologram, said method comprising the steps of:

a) measuring a first scattering intensity at a first angle θ[k] between said reference beam and said signal beam and a second scattered intensity at a second angle θ[k+n] between said reference beam and said signal beam;

b) measuring a minimum wavelength separation at said first angle θ[k] and at said second angle θ[k+n]; and c) selecting as an optimal angle in dependence on said first and second scattering intensities and on said minimum wavelength separation, said optimal angle selected from the group consisting of said first angle θ[k] and said second angle θ[k+n].

d) recording said hologram at said optimal angle between said reference beam and said signal beam.

2. The method of claim 1, further comprising the steps of:

a) computing a first value f[k] and a second value f[k+n] of a utility function f, said first value and said second value of said utility function depending on said scattering intensity and on said minimum wavelength separation;

b) selecting an optimal value f[k] in dependence on the unity function f, said optimal value f[k] selected from the group consisting of said first value and said second value; and c) choosing an optimal angle in dependence on said optimal value f[k] to record said hologram.

* * * * *